(12) United States Patent
Kuo

(10) Patent No.: US 6,540,552 B1
(45) Date of Patent: Apr. 1, 2003

(54) STACKED ELECTRICAL CARD CONNECTOR ASSEMBLY

(75) Inventor: Ming-Lun Kuo, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/023,613

(22) Filed: Dec. 17, 2001

(51) Int. Cl.⁷ .............................................. H01R 13/60
(52) U.S. Cl. ................................................... 439/541.5
(58) Field of Search .............................. 439/64, 541.5, 439/67, 77, 79, 607, 609

(56) References Cited

U.S. PATENT DOCUMENTS

| | | | | |
|---|---|---|---|---|
| 5,709,568 A | * | 1/1998 | Pan et al. ................. | 439/541.5 |
| 5,713,747 A | * | 2/1998 | Hsia et al. ................ | 439/541.5 |
| 5,775,923 A | * | 7/1998 | Tomioka ................... | 439/541.5 |
| 5,954,522 A | * | 9/1999 | Ho et al. .................. | 439/541.5 |
| 5,967,803 A | * | 10/1999 | Ho .......................... | 439/541.5 |
| 6,062,904 A | * | 5/2000 | Oguchi et al. ........... | 439/541.5 |
| 6,129,564 A | * | 10/2000 | Kawamae et al. ....... | 439/541.5 |
| 6,287,129 B1 | * | 9/2001 | Kuo ......................... | 439/541.5 |

* cited by examiner

Primary Examiner—Gary Paumen
(74) Attorney, Agent, or Firm—Wei Te Chung

(57) ABSTRACT

A stacked electronic card connector assembly includes a Smart Card connector including a housing retaining a number of first contacts and a Card Bus connector including a header retaining a number of second contacts. An insulative frame defines an opening to receive and retain the housing of the Smart Card connector. The frame is secured to the header of the Card Bus connector for interposing and fixing the housing therebetween thereby forming a stack. A first portion of a board-to-board connector is connected to the first and second contacts by a flexible printed circuit board. A second portion of the board-to-board connector is mounted a main computer board of for example a notebook computer.

1 Claim, 10 Drawing Sheets

STACKED ELECTRICAL CARD CONNECTOR ASSEMBLY

FIELD OF THE INVENTION

The present invention generally relates to electronic card connectors for reading/accessing electronic cards, such as memory cards, and in particular to a stacked assembly of two electronic card connectors of different types, such as a PCMCIA/Card Bus connector and a Smart Card connector.

BACKGROUND OF THE INVENTION

Electronic card connectors have been widely used in a variety of electronic devices that require additional memory. Examples of the electronic cards are PCMCIA (Card Bus) cards and Smart Cards. Each different electronic card can only be accessed by means of a unique connector. Conventionally, a PCMCIA/Card Bus connector and a Smart Card connector are individually mounted in for example a notebook computer. This not only increases the number of parts of the notebook computer, but also requires a great amount of space for accommodating these individual electronic card connectors.

It is thus desirable to provide a stacked assembly of a PCMCIA/Card Bus connector and a Smart Card connector for alleviating the above-discussed problems. Two other copending applications with unknown serial numbers, the same applicant, the same title, the same assignee and the same filing date, also disclose some other approaches to cure the shortcoming of the prior art.

SUMMARY OF THE INVENTION

Accordingly, an object of the present invention is to provide a stacked assembly of a PCMCIA/Card Bus connector and a Smart Card connector Another object of the present invention is to provide a stacked electronic card connector assembly comprising two different electronic card connectors stacked over each other for reducing footprint of a printed circuit board that the electronic card connectors occupy.

A further object of the present invention is to provide an electronic card connector assembly which comprises less number of parts.

To achieve the above objects, in accordance with the present invention, there is provided a stacked electronic card connector assembly comprising a first electronic card connector, such as a Smart Card connector, comprising a housing retaining a number of first contacts and a second electronic card connector, such as a Card Bus connector, comprising a header retaining a number of second contacts. An insulative frame defines an opening to receive and retain the housing of the first electronic card connector. The frame is secured to the header of the second electronic card connector for interposing and fixing the housing therebetween thereby forming a stack. A first portion of a board-to-board connector is connected to the first and second contacts by a flexible printed circuit board. A second portion of the board-to-board connector is mounted a main computer board of for example a notebook computer.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
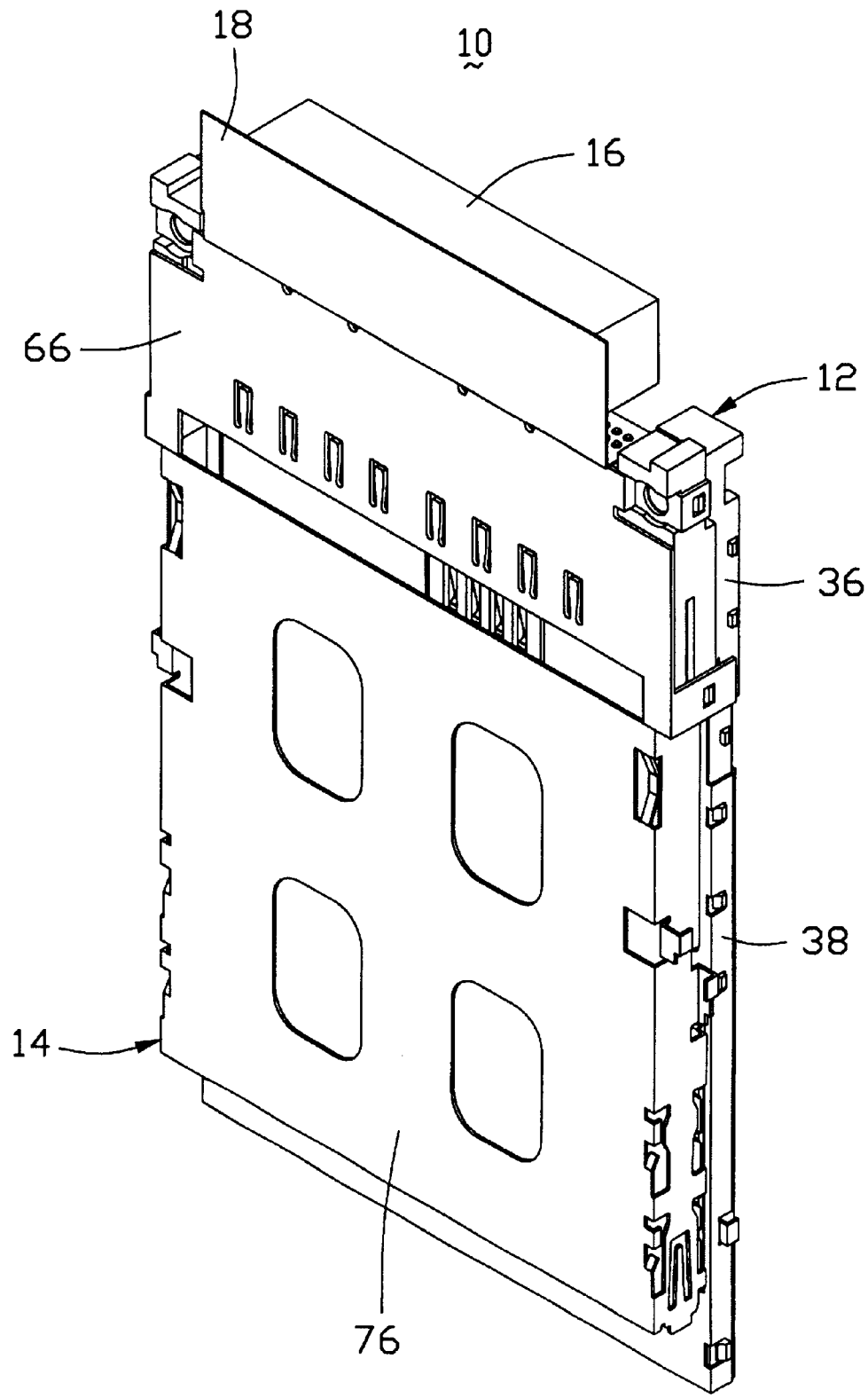
FIG. 1 is a perspective view of a stacked electronic card connector assembly constructed in accordance with the present invention.
Figure 2:
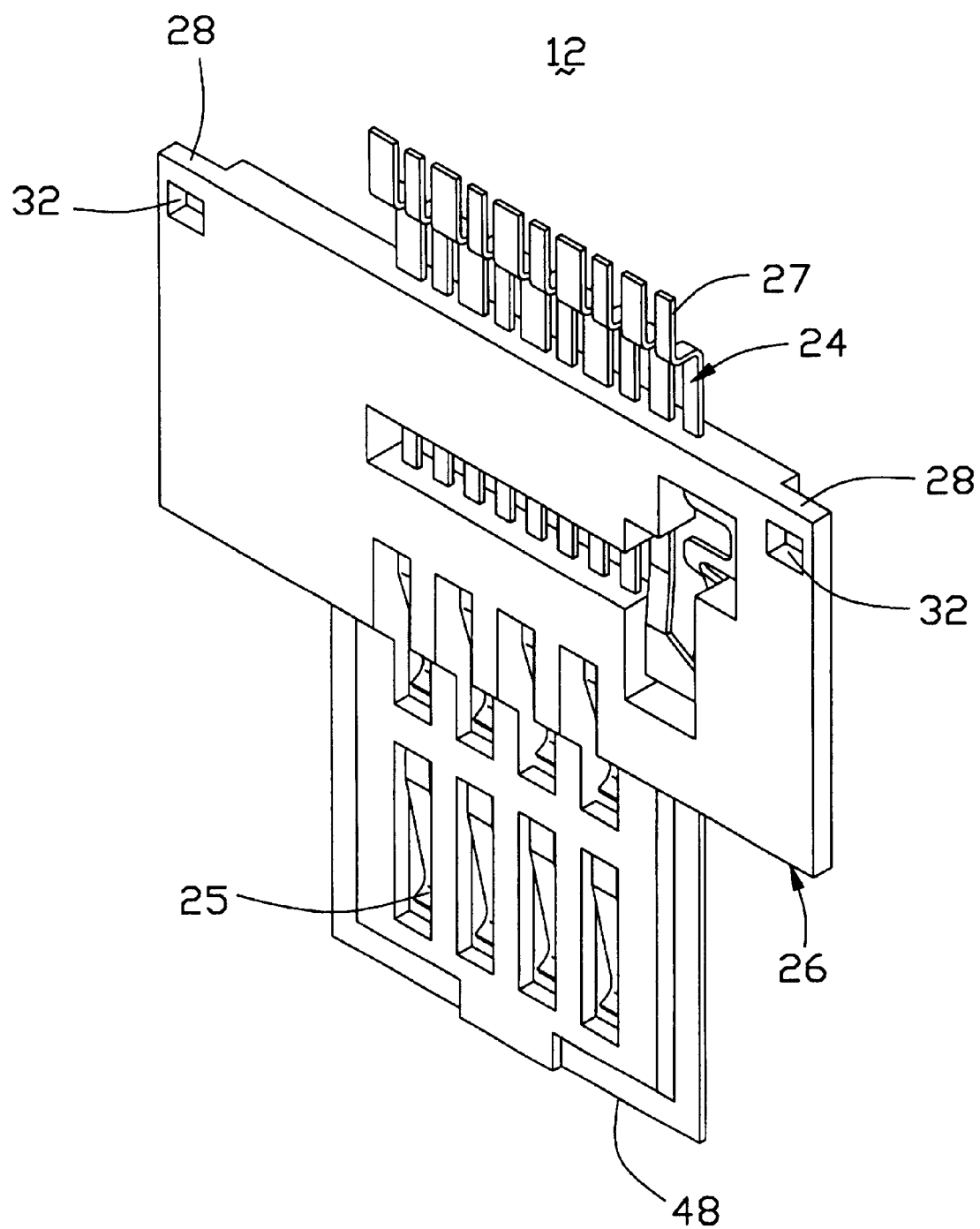
FIG. 2 is a perspective view showing a first, Smart Card connector of the stacked electronic card connector assembly in accordance with the present invention.
Figure 3:
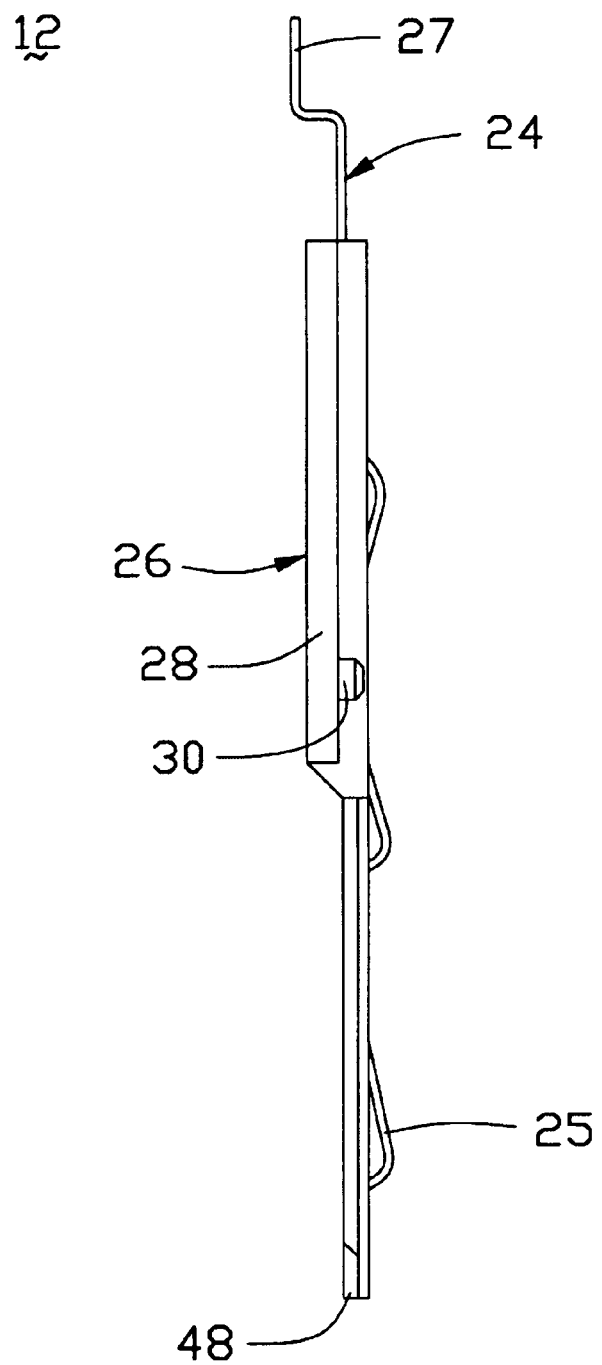
FIG. 3 is a side elevational view of the Smart Card connector shown in FIG. 2.
Figure 4:
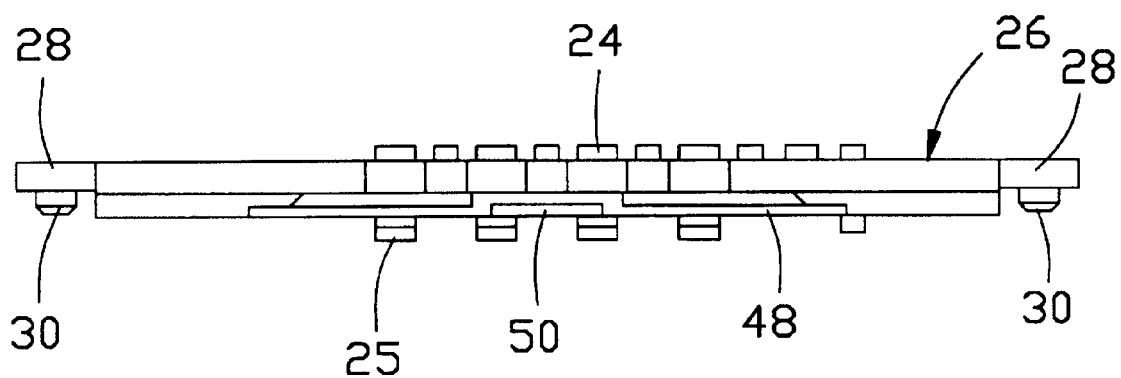
FIG. 4 is an end view of the Smart Card connector shown in FIG. 2.
Figure 5:
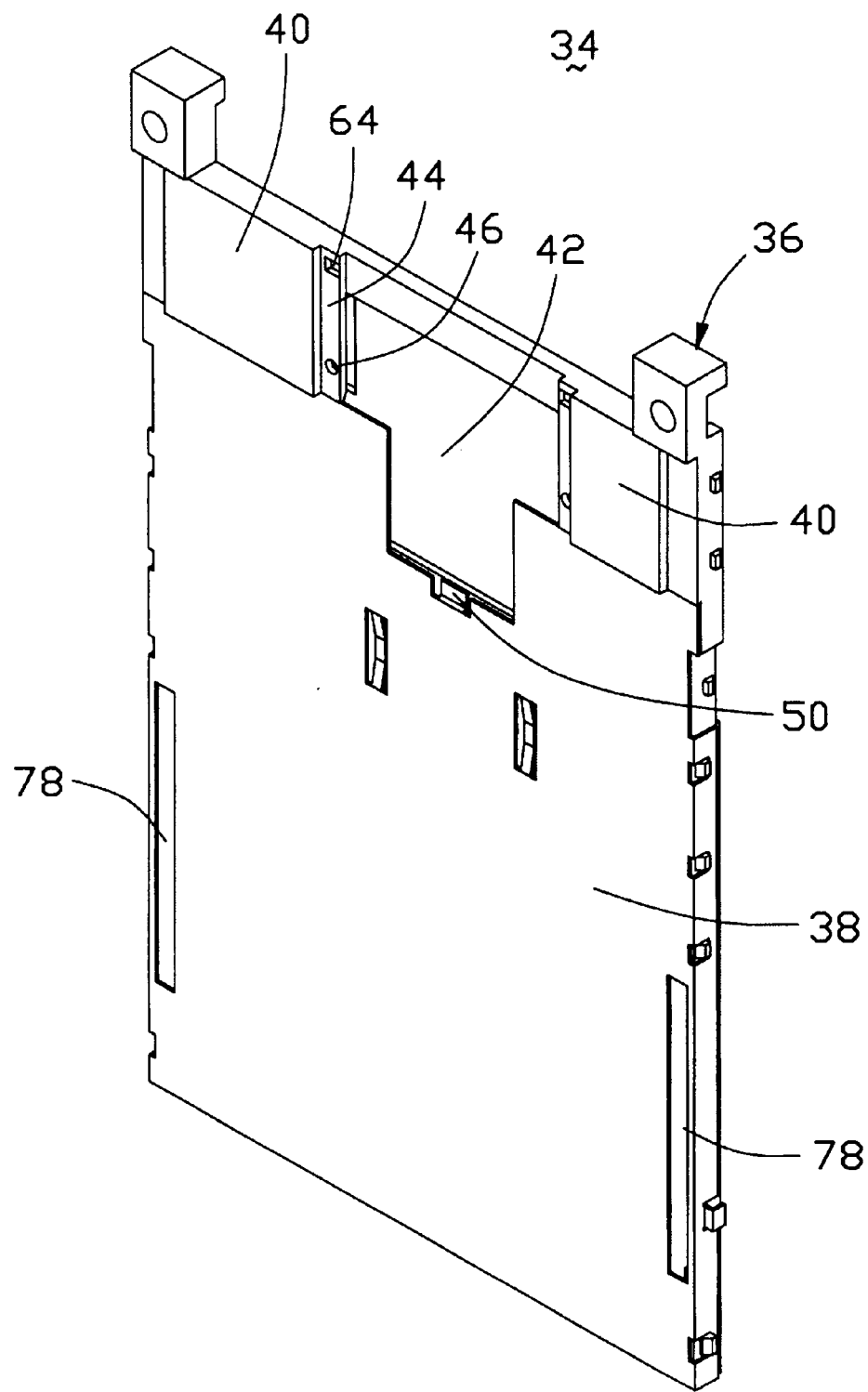
FIG. 5 is a perspective view of a retention housing of the Smart Card connector shown in FIG. 2.
Figure 6:
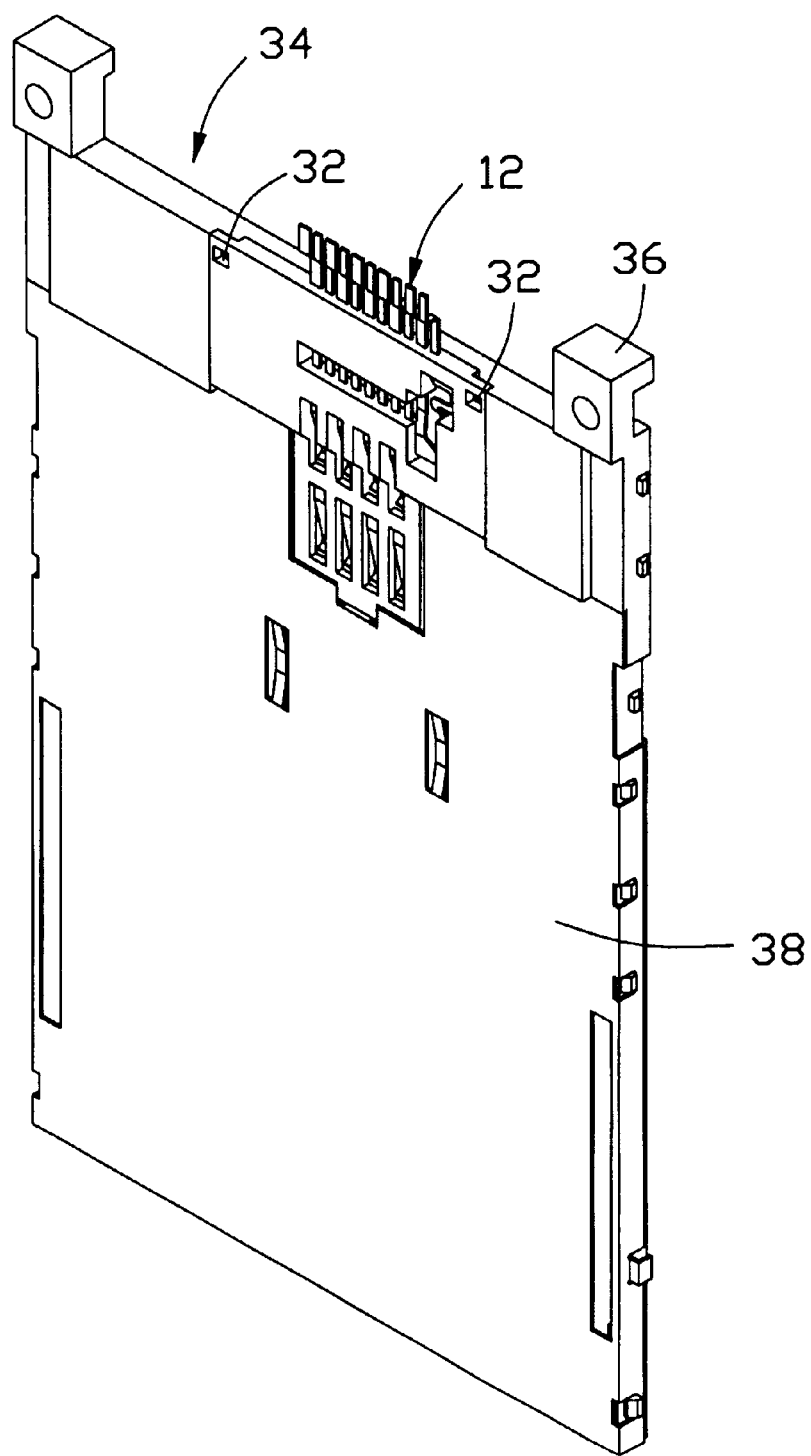
FIG. 6 is similar to FIG. 5 but showing the Smart Card connector mounted in the retention housing of FIG. 5.
Figure 10:
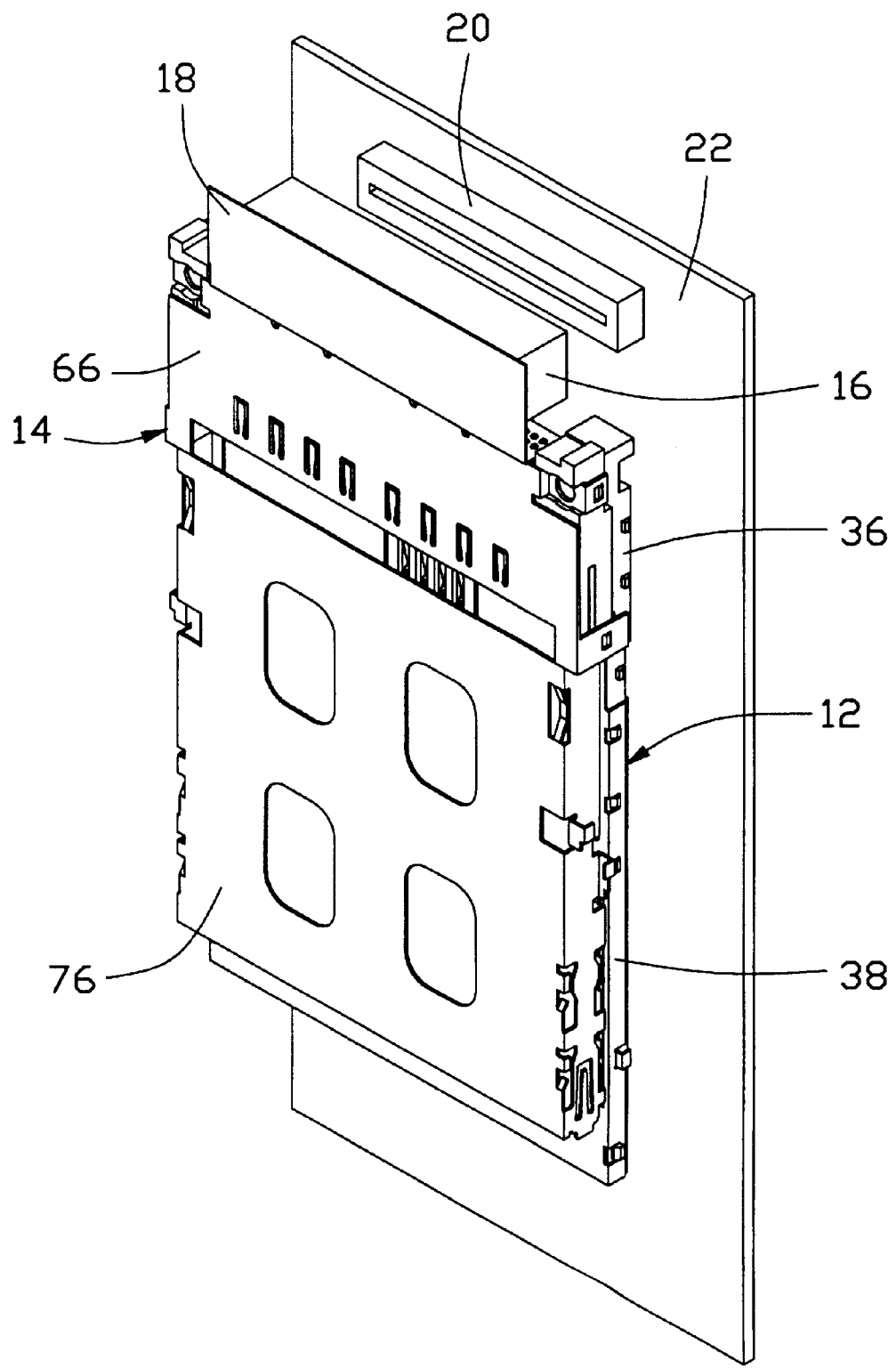
FIG. 10 is a perspective view showing the stacked electronic card connector assembly mounted to a printed circuit board.

With reference to the drawings and in particular to FIGS. 1 and 10, a stacked electronic card connector assembly constructed in accordance with the present invention, generally designated with reference numeral 10, comprises a first electronic card connector 12 and a second electronic card connector 14 fixed to each other in a stacking fashion whereby the second electronic card connector 14 is stacked over the first electronic cad connector 12. An electrical connector 16 is electrically connected to both the first and second electronic card connectors 12, 14 by means of a flexible printed circuit board 18. In the embodiment illustrated, the electrical connector 16 is a first portion of a so called board-to-board connector which comprises a second portion 20 mounted on a printed circuit board 22 and mateable with the first portion 16 for electrically connecting the electronic card connectors 12, 14 to the printed circuit board 22. The printed circuit board 22 may be a main board of a notebook computer (not shown).

Also referring to FIGS. 2–6, in the embodiment illustrated, the first electronic card connector 12 is a Smart Card connector comprising a number of first conductive contacts 24 retained in a first insulative housing 26. The first contacts 24 have a resilient or elastically deformable portions 25 extend beyond the first housing 26 for electrically engaging a Smart Card (not shown). One way to fix the first contacts 24 in the first housing 26 is insert molding. This is well known and thus no further detail is needed herein. The first housing 26 forms step-like flanges 28 on opposite sides thereof, A cylindrical projection 30 is formed on the flange 28. A slot 32 is defined in each flange 28.

The first electronic card connector 12 also comprises a retention housing 34 comprises an insulative frame 36 supporting a first shielding shell 38 made of a conductive material, such as metal. The frame 36 comprises two spaced and opposite portions 40 defining an interior space therebetween for guiding and receiving a Smart Card (not shown). An opening 42 is defined in the frame 36 for accommodating the first electronic card connector 12. Two steps 44 are formed along opposite side walls of the opening 42 and each step 44 defines a bore 46. The first electronic card connector 12 is received in the opening 42 with the side flanges 28 positioned on and supported by the steps 44 of the opening 42. The cylindrical projections 30 of the side flanges 28 receivingly engage the bores 46 of the steps 44 for properly positioning the first housing 26 in the frame 36. If desired, a force fit may be formed between the projections 30 and the bores 46 for retaining the first electronic card connector 12 in the retention housing 34.

The first housing 26 of the first electronic card connector 12 has an inner end wall 48 in which a cavity 50 is defined. Corresponding to the cavity 50, the first shielding shell 38 forms a tab 52 received in and engaging the cavity 50 for attaching the parts together and for positioning these parts with respect to each other.

Figure 7:
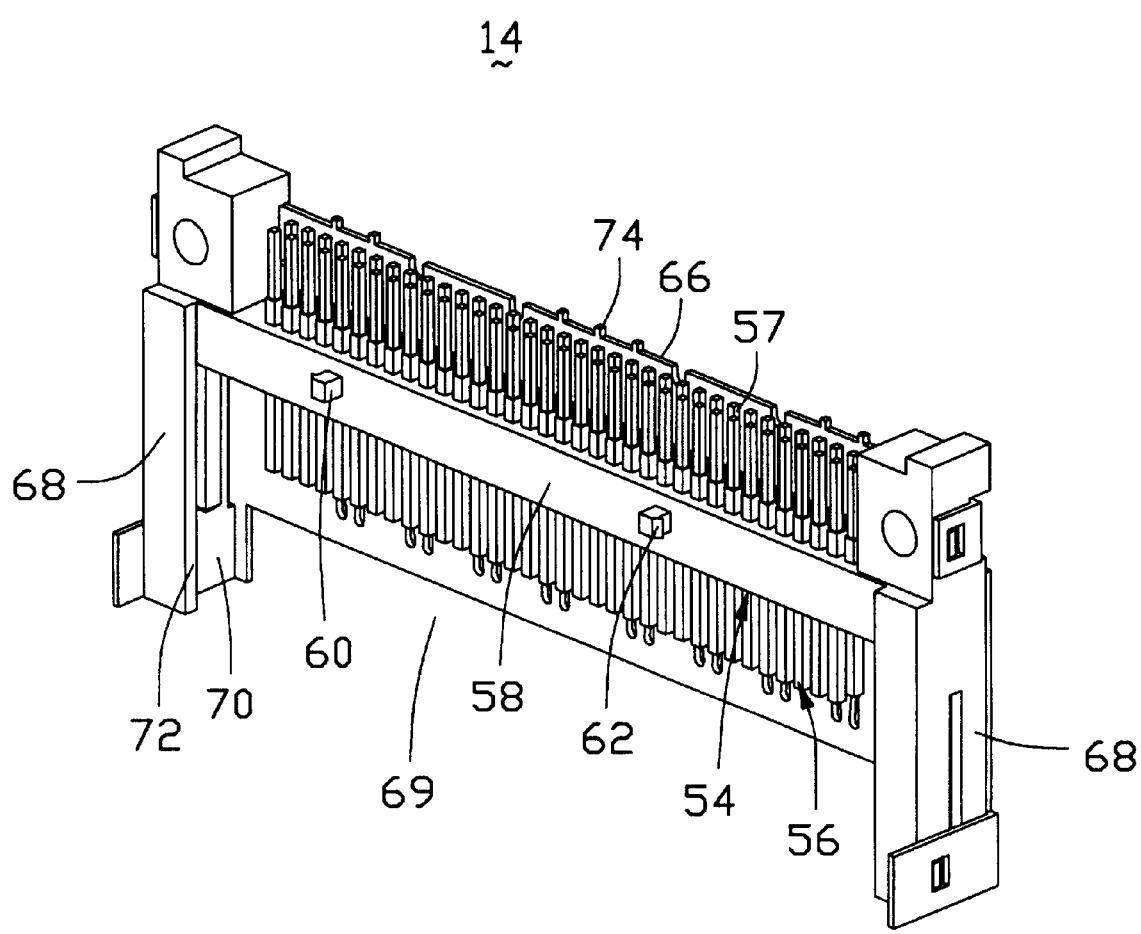
FIG. 7 is a perspective view of a second, PCMCIA/Card Bus connector of the stacked electronic card connector assembly in accordance with the present invention.

Also referring to FIG. 7, in the embodiment illustrated, the second electronic card connector 14 is a PCMCIA/Card Bus connector comprising an insulative header 54 retaining a number of second conductive contacts 56 extending beyond the header 54 in opposite sides of the header 54. An outward-facing surface 58 is stacked on the first electronic card connector 12 and partly the insulative frame 36 for interposing the first electronic card connector 12 between the frame 36 and the second electronic card connector 14. Two latches 60 are formed on and extending from the outward-facing surface 58, each comprising a barb 62 extending in opposite directions. The latches 60 extend into the slots 32 defined in the first housing 26 with the barbs 62 engage edges of the slots 32 to secure the second electronic card connector 14 to the first electronic card connector 12. If desired, recesses 64 can be formed in the steps 44 of the frame 36 of the first electronic card connector 12, corresponding to and aligned with the slots 32 for accommodating the portions of the latches 60 that extend beyond the first housing 26 of the first electronic card connector 12. If desired, the latches 60 can be dimensioned to extend through both the slots 32 and the recesses 64 for securing the second electronic card connector 14 and the first electronic card connector 12 to the frame 36 of the retention housing 34. However, it is understood that the second electronic card connector 14 can be secured to the first electronic card connector 12 and the frame 36 by any known means, such as bolts.

A shielding plate 66 is attached to the header 54 opposite to the outward-facing surface 58. The shielding plate 66 substantially covers the second contacts 56 for EMI (Electro-Magnetic Interference) protection and grounding purposes.

Figure 8:
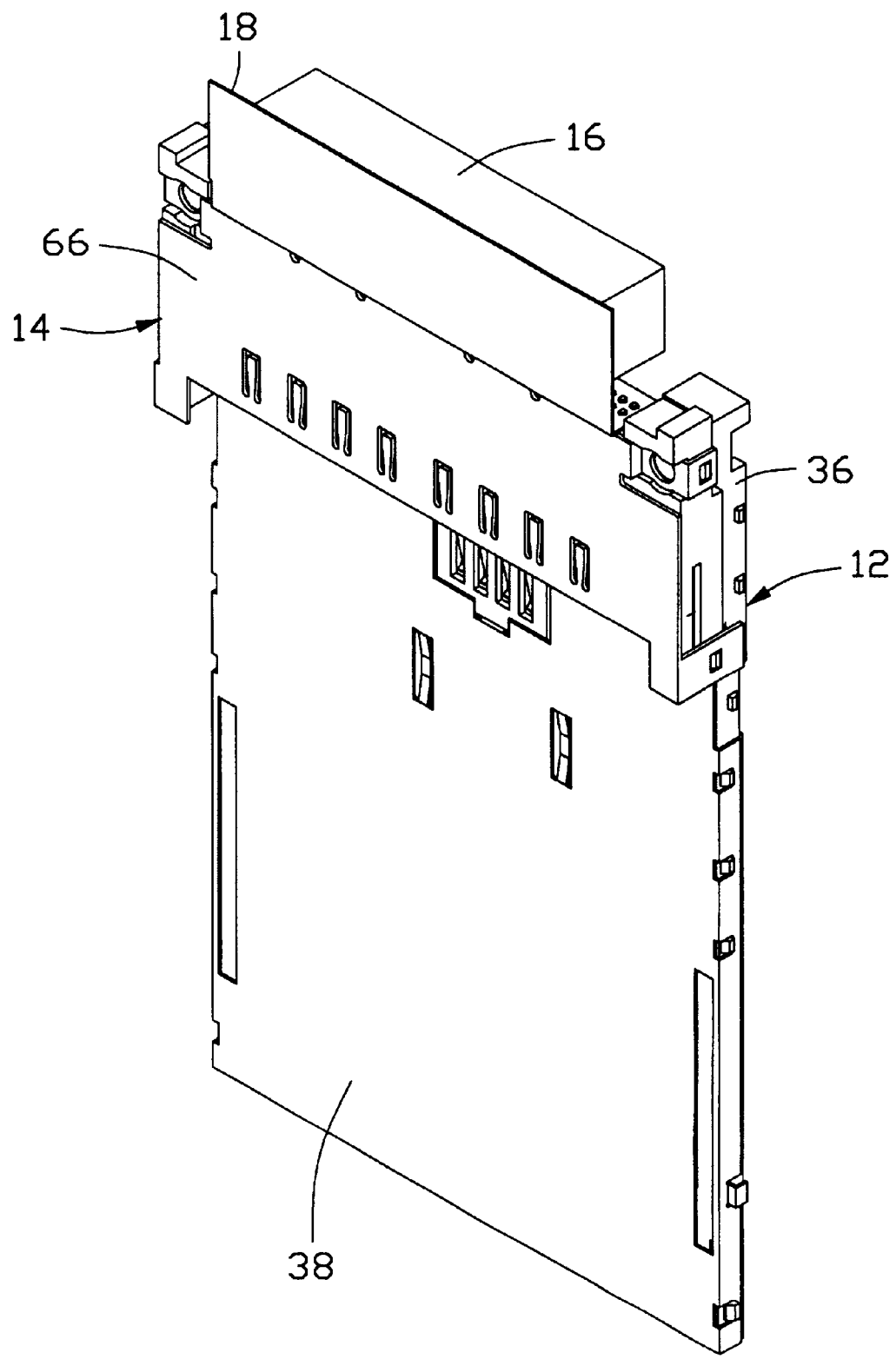
FIG. 8 is an assembled view of the Smart Card connector, as well as the retention housing thereof, and the PCMCIA/Card Bus connector.
Figure 9:
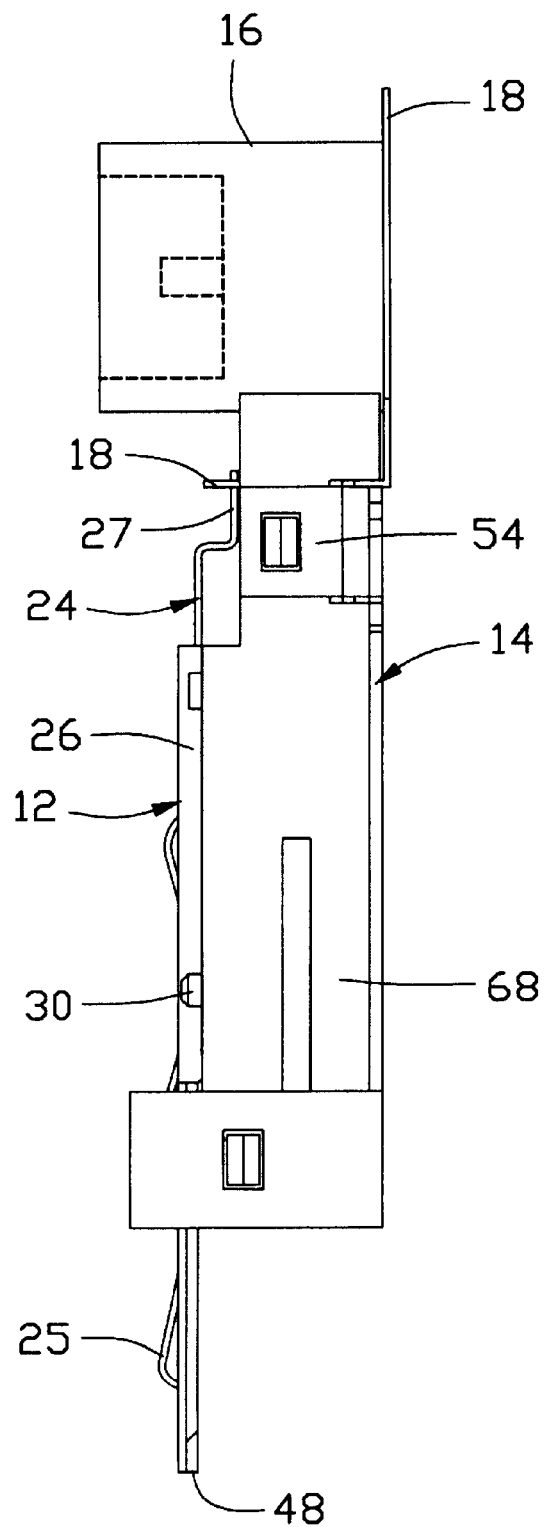
FIG. 9 is a side elevational view of FIG. 8 with the retention housing of the Smart Card connector removed.

Two guide arms 68 extend from opposite ends of the header 54 forming an interior space 69 therebetween for accommodating a PCMCIA card (not shown). A guiding slot 70 is defined in an inside face 72 of each arm 68 for guiding the PCMCIA card toward the second contacts 56 and thus establishing electrical engagement therebetween.

referring to FIGS. 8 and 9, the electronic card connectors 12, 14 are connected to a first one of a pair of mateable connectors, 16, 20. As mentioned above, the pair of mateable connectors 16, 20 is a board-to-board connector comprising a first portion 16 and a second portion 20 that are mateable with each other. The first connector 16 is electrically connected to the electronic card connectors 12, 14 by a flexible circuit board 18 on which a conductive pattern is formed. The first connector 16 is mounted to the flexible circuit board 18 and is electrically connected to the conductive pattern. Holes (not labeled) are defined in the flexible circuit board 18 corresponding to the conductive pattern. Tails 27, 57 of the first and second contacts 24, 56 that extend beyond the first housing 26 and header 54 of the first and second electronic card connectors 12, 14 are received in the holes and soldered to the conductive pattern to establish electrical connection therebetween. The shielding plate 64 forms a number of projections 74 received in corresponding holes (not labeled) defined in the flexible circuit board 18 and soldered thereto for forming grounding connection.

Also referring to FIG. 10, a second, outer shielding shell 76 is attached to and supported by the first shielding shell 36 defining a space continuous with the interior space 69 of the header 54 for receiving and accommodating the PCMCIA card. The second shielding shell 76 is provided with extensions (not shown) received in and engaging with slits 78 defined in the first shielding shell 38 for securing the first shielding shell 76 to the first shielding shell 38. Other known securing means may also be employed to secure the parts of the connector assembly 100 together. Details are not needed herein.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An electronic card connector assembly comprising:
   a first electronic card, comprising:
      a first insulative housing retaining first conductive contacts, each first contact having a first tail extending beyond the first housing, and
      a second housing comprising an insulative frame supporting a first shielding shell made of a conductive material, a passageway being defined in the insulative frame for guidingly receiving a first electronic card, the insulative frame defining an opening in which the first insulative housing is received and retained;
   a second electronic card connector attached to the second housing, the second electronic card connector comprising an insulative header retaining second conductive contacts, each second contact having a second tail extending beyond the header; and
   a connection device comprising a flexible printed circuit board defining holes therein for receiving the first and second tails of the first and second contacts to form electrical connection between the flexible printed circuit board and the first and second contacts:
      wherein the connection device further comprises a board-to-board connector comprising mateable first and second portions, the first portion being mounted to the flexible printed circuit board, while the second portion is adapted to connect to an external device;
      wherein the second electronic card connector comprises a second shielding shell supported on the first shielding shell and defining an interior space for receiving a second electronic card;
      wherein two guide arms extend from opposite ends of the header forming a space therebetween continuous with the interior space defined by the second shielding shell, the guide arms guidingly receiving the second electronic card therebetween;
      wherein two latches are formed on the header of the second electronic card connector, two slots being defined in the first housing of the first electronic card connector for engaging the latches;

wherein the latches have barbs for engaging the slots;

wherein the opening of the frame of the first electronic card connector is defined by opposite side walls, each side wall forming a step, the first housing having flanges along opposite sides thereof for being positioned on and supported by the steps of the frame;

wherein at least one cylindrical projection is formed on each flange of the first housing for being fit into a corresponding hole defined in the corresponding step of the frame;

wherein an end wall of the first housing defines a recess for engaging with a tab extending from the first shielding shell;

wherein the first housing of the first electronic card connector is interposed between the header of the second electronic card connector and the frame of the first electronic card connector;

wherein the first electronic card connector is a Smart Card connector;

wherein the second electronic card connector is a Card Bus connector.

* * * * *